(12) United States Patent
Park et al.

(10) Patent No.: US 9,527,377 B2
(45) Date of Patent: Dec. 27, 2016

(54) POWERTRAIN FOR HYBRID VEHICLE

(71) Applicant: Hyundai Motor Company, Seoul (KR)

(72) Inventors: Jong Yun Park, Hwaseong-si (KR); Jae Young Choi, Busan (KR); Kyung Ha Kim, Yongin-si (KR); Ki Nam Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/693,223

(22) Filed: Apr. 22, 2015

(65) Prior Publication Data

US 2016/0144705 A1 May 26, 2016

(30) Foreign Application Priority Data

Nov. 25, 2014 (KR) .......................... 10-2014-0165017

(51) Int. Cl.
*B60K 6/36* (2007.10)
*B60K 6/54* (2007.10)
(Continued)

(52) U.S. Cl.
CPC . *B60K 6/54* (2013.01); *B60K 6/36* (2013.01); *B60K 6/387* (2013.01); *B60K 6/445* (2013.01); *F16H 3/728* (2013.01); *B60K 6/365* (2013.01); *B60K 6/547* (2013.01); *B60K 2006/381* (2013.01); *F16H 2037/0873* (2013.01); *F16H 2200/2005* (2013.01);
(Continued)

(58) Field of Classification Search
CPC ........... B60K 6/365; B60K 6/54; B60K 6/445; B60K 6/547; F16H 37/046; F16H 2200/2005; F16H 2200/2033; F16H 2200/2094; Y10S 903/91
USPC ............................................. 475/5, 207, 302
See application file for complete search history.

(56) References Cited

U.S. PATENT DOCUMENTS 6,159,127 A * 12/2000 Loeffler ................... B60K 6/26
477/5
6,558,283 B1 * 5/2003 Schnelle ............. F16H 37/0826
180/65.235
(Continued)

FOREIGN PATENT DOCUMENTS

JP 2005-132365 A 5/2005
JP 2006-77859 A 3/2006
(Continued)

*Primary Examiner* — Roger Pang
(74) *Attorney, Agent, or Firm* — Morgan, Lewis & Bockius LLP

(57) ABSTRACT

A powertrain apparatus may include a planetary gear set including a first rotary member connected to a first motor and selectively operating as an input element or a fixing element, a second rotary member supplied with power from an engine and selectively operating as an input element, and a third rotary member connected to an output shaft and selectively operating as an output element, a second motor supplying power to a motor input shaft, and a transmission including a plurality of pairs of engaged gears forming different transmission gear ratios, the pairs of engaged gears being provided on the motor input shaft and the output shaft, respectively, with an engaging unit provided on the motor input shaft at a location between the pairs of engaged gears and selecting one of the pairs of engaged gears corresponding to a driving speed.

6 Claims, 5 Drawing Sheets

(51) Int. Cl.
  *B60K 6/445*  (2007.10)
  *B60K 6/387*  (2007.10)
  *F16H 3/72*   (2006.01)
  *B60K 6/365*   (2007.10)
  *B60K 6/547*   (2007.10)
  *B60K 6/38*    (2007.10)
  *F16H 37/08*   (2006.01)

(52) U.S. Cl.
  CPC .............. *F16H 2200/2033* (2013.01); *F16H 2200/2094* (2013.01); *Y10S 903/91* (2013.01)

(56) References Cited

U.S. PATENT DOCUMENTS

| | | |
|---|---|---|
| 6,634,986 B2 | 10/2003 | Kima |
| 6,840,341 B2 | 1/2005 | Fujikawa |
| 8,512,187 B2 * | 8/2013 | Puiu .................. B60K 6/445 475/5 |
| 8,734,281 B2 * | 5/2014 | Ai ...................... B60K 6/445 180/65.21 |
| 9,316,291 B2 | 4/2016 | Lee |
| 2003/0232678 A1 | 12/2003 | Yamauchi |
| 2008/0171625 A1 | 7/2008 | Goldschmidt et al. |
| 2009/0011887 A1 * | 1/2009 | Komada .................. B60K 6/36 475/5 |
| 2009/0170649 A1 * | 7/2009 | Murakami ............. B60K 6/365 475/5 |
| 2010/0000814 A1 * | 1/2010 | Katsuta .................. B60K 6/387 180/65.265 |
| 2010/0044128 A1 * | 2/2010 | Oba ........................ B60K 6/387 180/65.25 |
| 2012/0310461 A1 * | 12/2012 | Maruyama ............. B60K 6/445 701/22 |
| 2015/0018152 A1 | 1/2015 | Kato |
| 2015/0111682 A1 | 4/2015 | Park |

FOREIGN PATENT DOCUMENTS

| | | |
|---|---|---|
| JP | 2007-69843 A | 3/2007 |
| JP | 2008-56236 A | 3/2008 |
| JP | 2008-174163 A | 7/2008 |
| JP | 2012-519617 A | 8/2012 |
| JP | 2013-86654 A | 5/2013 |
| KR | 10-2007-0079672 A | 8/2007 |
| KR | 10-0893438 B1 | 4/2009 |
| KR | 10-0996132 B1 | 11/2010 |
| KR | 10-1144501 B1 | 5/2012 |
| KR | 10-2012-0140099 A | 12/2012 |
| KR | 10-2013-0056128 A | 5/2013 |
| KR | 10-2013-0056640 A | 5/2013 |
| KR | 10-2013-0066225 A | 6/2013 |
| KR | 10-2014-0079242 B1 | 6/2014 |
| KR | 10-2014-0080638 A | 7/2014 |
| KR | 10-1428421 B1 | 8/2014 |
| WO | WO 2010101296 A1 | 9/2010 |

\* cited by examiner

<Engine OD mode + EV mode-first range>

—— Power from second motor
– – – – – Power from engine

<Engine OD mode + EV mode-second range>

—— Power from second motor
– – – – – Power from engine

POWERTRAIN FOR HYBRID VEHICLE

CROSS REFERENCE TO RELATED APPLICATION

The present application claims priority of Korean Patent Application Number 10-2014-0165017 filed on Nov. 25, 2014, the entire contents of which application are incorporated herein for all purposes by this reference.

BACKGROUND OF THE INVENTION

Field of the Invention

The present invention generally relates to a powertrain for a hybrid vehicle.

Description of Related Art

A hybrid vehicle, which is driven by electric power and power from an internal combustion engine, is controlled to drive in periods with high system efficiency by an engine and an electric motor, so the entire efficiency is high and an exhaust gas can be significantly reduced, thus such a vehicle has been increasingly used and is representative of a typical environment-friendly vehicle.

The way of splitting power in a hybrid vehicle is composed of a mechanical mechanism that transmits power from an engine directly to an output shaft, using a power split device that splits a power flow such as a planetary gear set and an electric mechanism that operates a generator to generate electricity using power from the engine and charges a battery with the generated power or drives a motor with the energy of the charged battery.

The power split type of hybrid system has an advantage in that it is possible to operate the engine independently from the output and freely turn on/off the engine during driving, and to achieve an electric vehicle mode.

Further, the effect of an electrically variable transmission obtained by two motor generators allows for efficient operation of the engine and the motor has constant output at each speed, so there is essentially no need for a transmission.

However, there is a need for a transmission to ensure low-speed torque at a high maximum speed of a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a powertrain for a hybrid vehicle that improves drivability of a vehicle by multiplying the shift ranges provided by a motor and reduces the manufacturing cost and weight by decreasing the capacity of a motor.

In an aspect of the present invention, there is provided a powertrain for a hybrid vehicle including a planetary gear set including a first rotary member connected to a first motor and selectively operating as an input element or a fixing element, a second rotary member supplied with power from an engine and selectively operating as an input element, and a third rotary member connected to an output shaft and selectively operating as an output element, a second motor supplying power to a motor input shaft, and a transmission including a plurality of pairs of engaged gears forming different transmission gear ratios, the pairs of engaged gears being provided on the motor input shaft and the output shaft, respectively, with an engaging unit provided on the motor input shaft at a location between the pairs of engaged gears and selecting one of the pairs of engaged gears corresponding to a driving speed.

In the planetary gear set, the first rotary member may be a sun gear, the second rotary member may be a carrier, and the third rotary member may be a ring gear.

A friction member may be connected to the first rotary member of the planetary gear set so that the first rotary member selectively operates as a fixing element.

The friction member may be a dog clutch selectively engaged between a transmission case and the first rotary member or a brake fixed to the transmission case.

The engaging unit may be a dog clutch.

According to the present invention, an engine EVT (electrically variable transmission) mode or an engine OD (overdrive) mode can be achieved and an EV mode and an HEV mode are achieved by independent EV mode-first and second ranges or a combination of them, so shift ranges are multiplied. Accordingly, drivability in an EV mode and at a high speed of a vehicle and the manufacturing cost and weight of a motor are reduced by decreasing the capacity of the motor.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
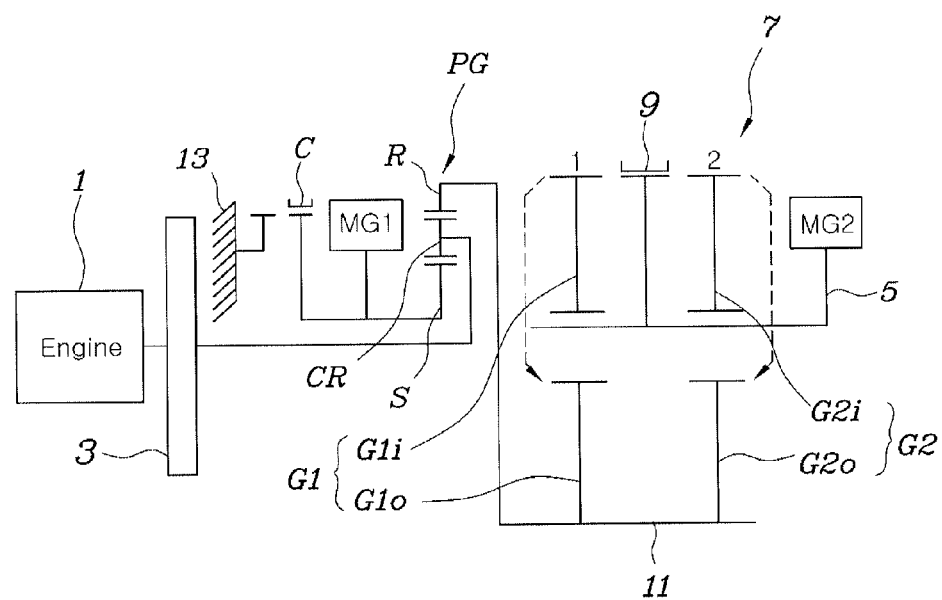
FIG. 1 is a diagram schematically showing an arrangement of a powertrain for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims Preferred embodiments of the present invention will be described hereafter in detail with reference to the accompanying drawings.

A powertrain for a hybrid vehicle of the present invention includes a planetary gear set PG, a second motor MG2, and a transmission 7.

Describing the present invention in detail with reference to FIG. 1, first, the planetary gear set PG may include a first rotary member connected to a first motor MG1 and selectively operating as an input element or a fixing element, a second rotary member supplied with power from an engine 1 and selectively operating as an input element, and a third rotary member connected to an output shaft 11 and selectively operating as an output element.

In the planetary gear set PG, for example, the first rotary member may be a sun gear S, the second rotary member may be a carrier CR, and the third rotary member may be a ring gear R.

A friction member C may be connected to the first rotary member of the planetary gear set PG so that the first rotary member selectively operates as a fixing element.

Figure 5:
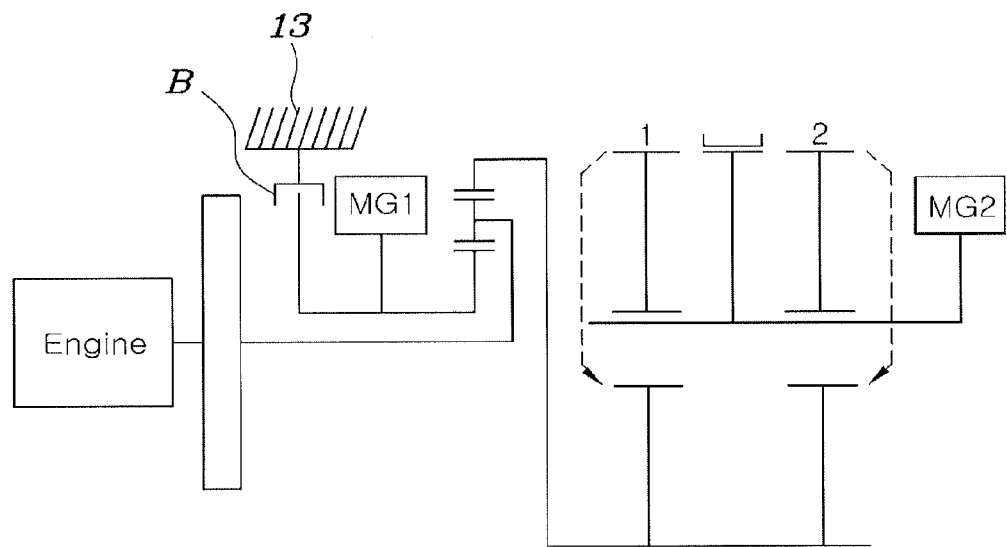
FIG. 5 is a diagram showing the structure of a powertrain for a hybrid vehicle according to another embodiment of the present invention.

The friction member C may be, as shown in FIG. 1, a dog clutch or a synchro-mesh type synchronizer that can be selectively engaged between the transmission case 13 and the first rotary member, or it may be a brake B fixed to the transmission case 13, as shown in FIG. 5.

For example, when the friction member C is a dog clutch, it is possible to stably engage the dog clutch by controlling the number of revolutions (to zero) of the first motor MG1.

Figure 6:
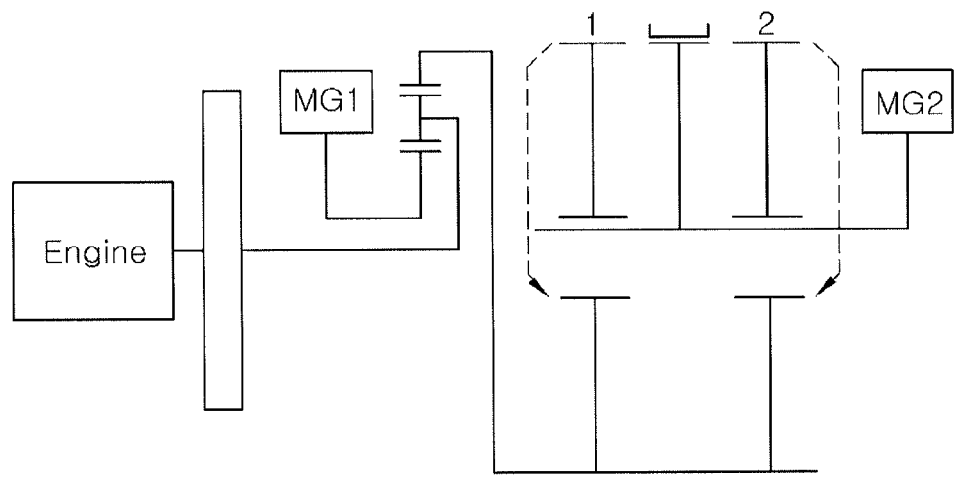
FIG. 6 is a diagram showing the structure of a powertrain for a hybrid vehicle according to another embodiment of the present invention.

When there is no friction member C, as shown in FIG. 6, and a vehicle is driven at a high speed in an engine EVT mode, it may be possible to fix the sun gear S of the planetary gear set PG by controlling the first motor MG1, there is however a loss of electric load.

The first motor MG1 and the second motor MG2 to be described below may be motor generators that can supply power and generate electricity.

That is, the sun gear S connected to the friction member C and can be fixed, the carrier CR is connected to the engine 1 and selectively supplied with torque from the engine 1, and the ring gear R is connected to the output shaft 11 and transmits torque to the output shaft 11.

A torsion damper 3 is provided between the engine 1 and the carrier CR and can reduce torsional vibration.

Accordingly, according to an exemplary embodiment of the present invention, it is possible to achieve an engine EVT mode (electrically variable transmission) of an engine OD (overdrive) mode by selectively operating the friction member C for braking and achieve an HEV mode by implementing a first range and a second range in an EV mode, thereby multiplying the shift ranges. Therefore, drivability of a vehicle at a high speed is improved.

Further, according to an exemplary embodiment of the present invention, a plurality of shift ranges with different gear ratios can be achieved while power from the second motor MG2 is transmitted through the transmission 7.

For this purpose, the present invention may further include the second motor MG2 and the transmission 7.

In detail, the second motor MG2 is connected to a motor input shaft 5 and provides torque to the motor input shaft 5.

The transmission 7 includes a plurality of pairs of engaged gears G1 and G2 provided on the motor input shaft 5 and the output shaft 11, respectively, and forming different transmission gear ratios, with an engaging unit provided on the motor input shaft 5 at a location between the pairs of engaged gears G1 and G2 and selecting one of the pairs of engaged gears G1 and G2 corresponding to a driving speed.

For example, the coupler 9 may be a dog clutch or synchro-mesh type synchronizer.

The pairs of engaged gears G1 and G2 may be a pair of first range gears G1 (first range input gear G1$i$ and a first range output gear G1$o$) for an EV1 range and a pair of second range gears G2 (second range input gear G2$i$ and a second range output gear G2$o$) for an EV 2 range, in which those input gears and output gears may be fitted on the motor input shaft 5 and the output shaft 11, respectively. The input gears G1$i$ and G2$i$ on the motor input shaft 5 may rotate relative to the motor input shaft 5 and a needle bearing may be fitted on the motor input shaft 5 at a location between the motor input shaft 5 and the input gears G1$i$ and G2$i$.

According to an exemplary embodiment of the present invention, the EV mode-first and second ranges can be achieved by selective engagement and disengagement by the engaging unit 9, the engine EVT mode and the engine OD mode can be achieved by selective braking by the friction member C, and the HEV mode can be achieved by combination of the EV mode-first and second ranges, and thus shift ranges can be multiplied. Therefore, it is possible to improve drivability in an EV mode and at a high speed of a vehicle and reduce the manufacturing cost and weight by decreasing the capacity of a motor.

Hereafter, the power flows in driving modes in an exemplary embodiment of the present invention are described.

<EV Mode>

Figure 2A:
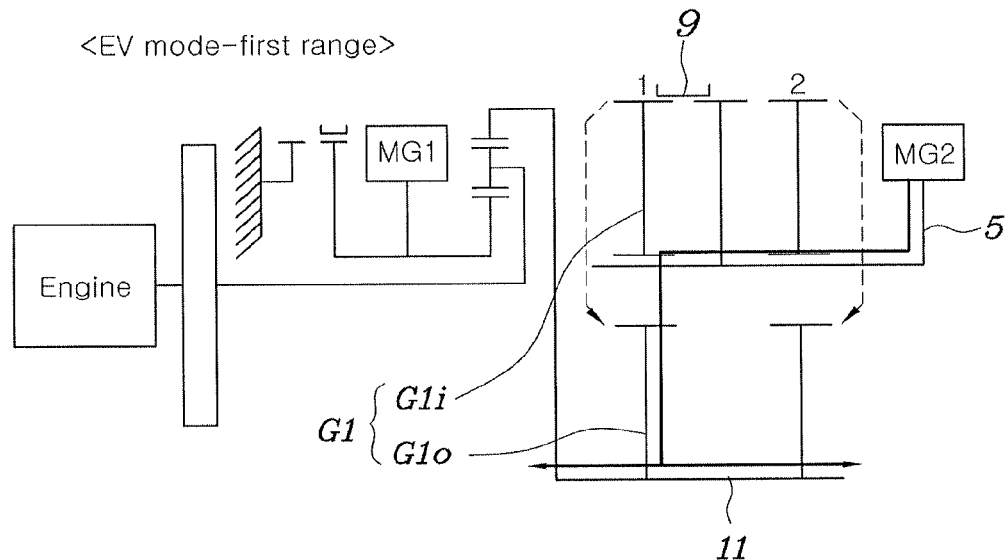
FIGS. 2A and 2B are diagrams showing power flows in driving at a first shift range and a second shift range in an EV mode according to an exemplary embodiment of the present invention.

Referring to FIG. 2A, the motor input shaft 5 rotates by power from the second motor MG2 and the engaging unit 9 is engaged with the first range input gear G1$i$, so the power is output through the first range output gear G1$o$ and a vehicle is driven in the EV mode-first range.

Figure 2B:
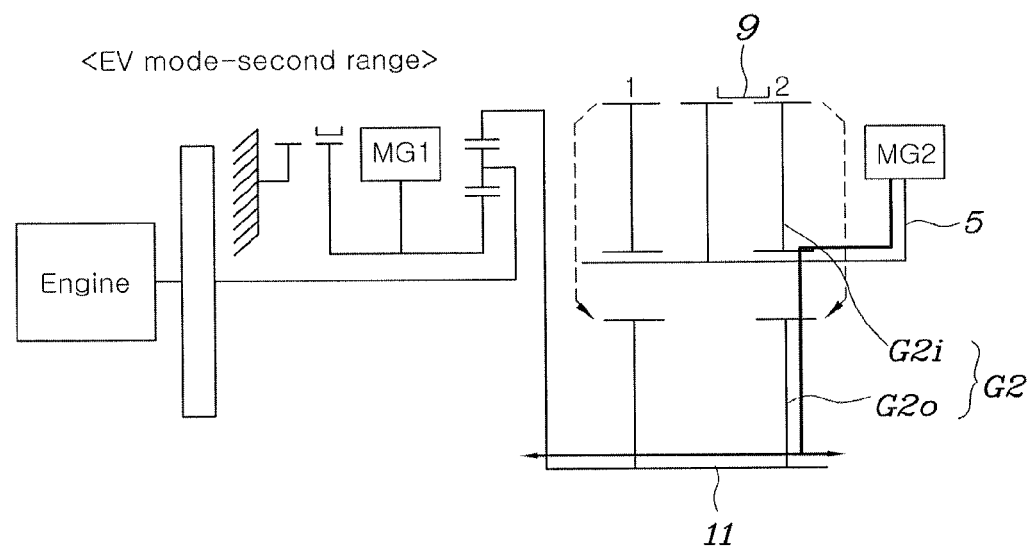

Referring to FIG. 2B, the motor input shaft 5 rotates by power from the second motor MG2, and in shifting from the EV mode-first range to the EV mode-second range, the engaging unit 9 is engaged with the second range input gear G2$i$ by controlling the second motor MG2, so shifting is performed without a torque drop and the power is output through the second output gear G2$o$. Therefore, a vehicle is driven in the EV mode-second range.

<Engine EVT Mode+EV Mode>

Figure 3A:
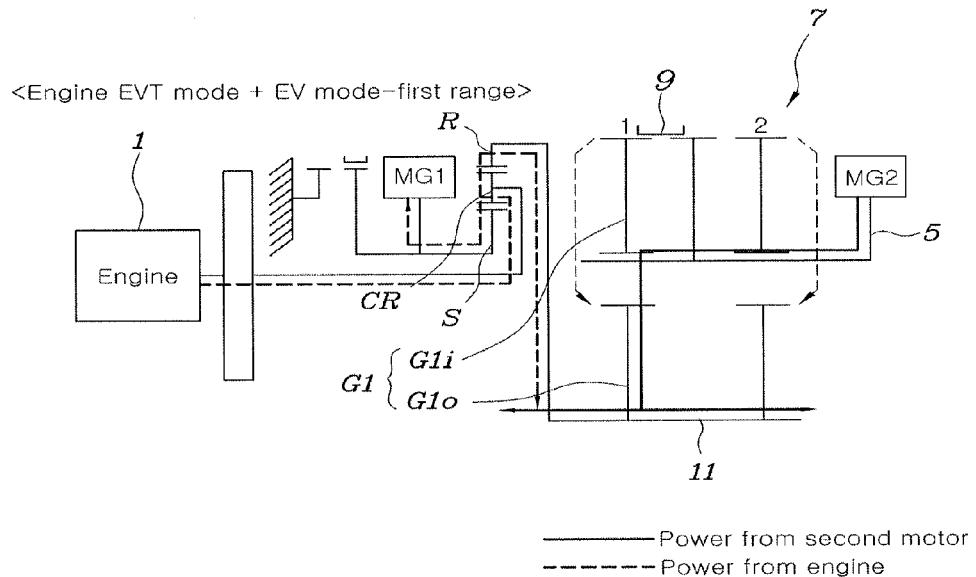
FIGS. 3A and 3B are diagrams showing power flows in driving at an EV1 range and an EV2 range in an engine EVT mode according to an exemplary embodiment of the present invention.

Referring to FIG. 3A, when the power from the engine 1 is input to the carrier CR, the power from the engine 1 can be controlled to be split to the first motor MG1 and the output shaft OUTPUT through the sun gear S and the ring gear R and used for power generation and output, or both the power from the first motor MG1 and the power from the engine 1 may be supplied to the output shaft 11.

Figure 3B:
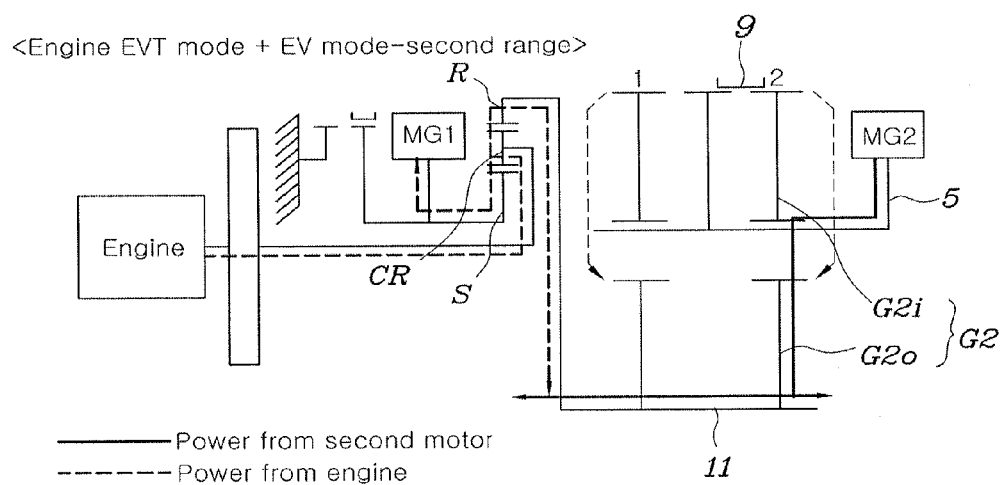

However, only the split flow of the power from the engine 1 is shown in FIGS. 3A and 3B.

Further, a vehicle can be driven in the EV mode-first range, as described above, by the power from the second motor MG2, so the engine EVT mode and the EV mode-first range are combined, thereby achieving a composite shift range.

Referring to FIG. 3B, as the power from the engine 1 is input to the carrier CR, as described above, the power from the engine 1 may be split by the planetary gear set PG or may be supplied to the output shaft 11 along with the power from the first motor MG1.

Further, a vehicle can be driven at the EV mode-second range, as described above, by shifting to the EV mode-first range to the EV mode-second range by the power from the second motor MG2, so the engine EVT mode and the EV mode-second range are combined, thereby achieving a composite shift range.

<Engine OD Mode+EV Mode>

Figure 4A:
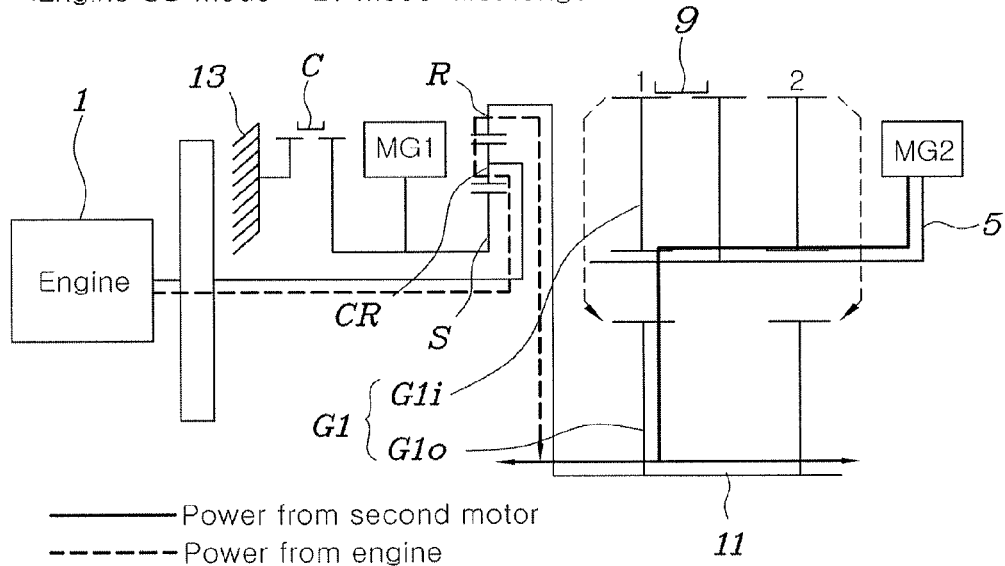
FIG. 4A and FIG. 4B are diagrams showing power flows in driving at an EV1 range and an EV2 range in an engine OD mode according to an exemplary embodiment of the present invention.

Referring to FIG. 4A, when the power from the engine 1 is input to the carrier CR, because the sun gear S is fixed by the friction member C, the power from the engine 1 is increased through the ring gear R and then transmitted to the output shaft 11.

Further, a vehicle can be driven in the EV mode-first range, as described above, by the power from the second motor MG2, so the engine OD mode and the EV mode-first range are combined, thereby achieving a composite shift range.

Figure 4B:
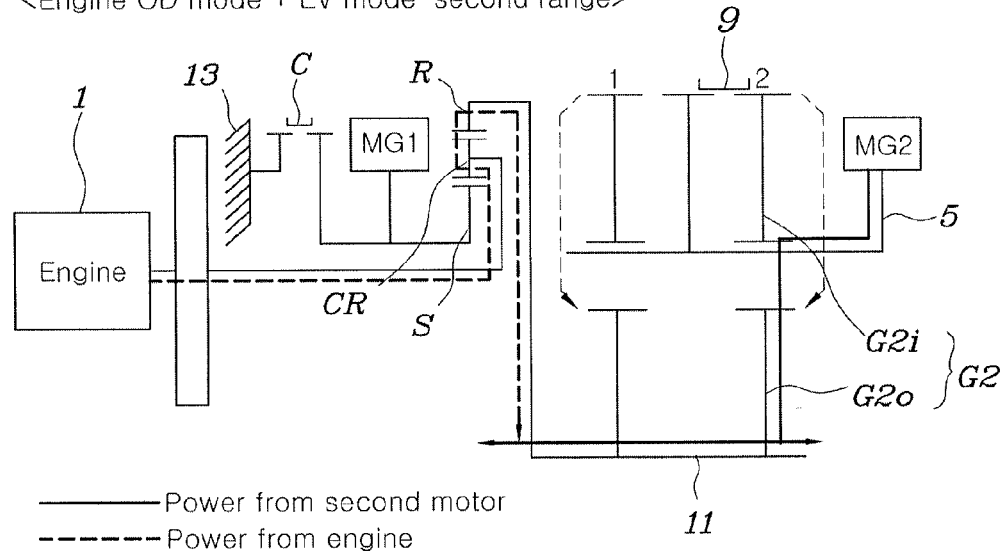

Referring to FIG. 4B, the power from the engine 1 is input to the carrier CR, and as described above, the power from the engine 1 is increased through the ring gear R and then transmitted to the output shaft 11.

Further, a vehicle can be driven in the second range in the EV mode, as described above, by shifting to the first range to the second range in the EV mode by device of the power from the second motor MG2, so the engine OD mode and the EV mode-second range are combined, thereby achieving a composite shift range.

In particular, when a vehicle is driven at a high speed in the engine OD mode, the sun gear S is fixed by the friction member C and the power from the engine 1 is increased, so it is not required to control the first motor MG1 in order to fix the sun gear S. Accordingly, a loss of electric load for controlling the first motor MG1 is reduced, which contributes to improving fuel efficiency.

Further, though not shown in the figures, when a vehicle is drive in the engine EVT mode, which is mode for driving only with an engine, the second motor MG2 freewheels by the needle bearing between the motor input shaft 5 and the input gears G1i and G2i, so there is no need of a load for operating the second motor MG2, which contributes to improving fuel efficiency.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain apparatus for a vehicle, comprising:
    a planetary gear set including:
        a first rotary member connected to a first motor and selectively operating as an input element or a fixing element;
        a second rotary member supplied with power from an engine and selectively operating as an input element; and
        a third rotary member continuously connected to an output shaft and operating as an output element;
    a second motor supplying power to and continuously connected to a motor input shaft; and
    a transmission including a plurality of pairs of engaged gears forming different transmission gear ratios, the pairs of engaged gears being provided on the motor input shaft and the output shaft, respectively, with an engaging unit provided on the motor input shaft at a location between the pairs of engaged gears and selecting one of the pairs of engaged gears corresponding to a driving speed.

2. The powertrain apparatus of claim 1, wherein in the planetary gear set, the first rotary member is a sun gear, the second rotary member is a carrier, and the third rotary member is a ring gear.

3. The powertrain apparatus of claim 2, wherein a friction member is connected to the first rotary member of the planetary gear set so that the first rotary member selectively operates as a fixing element.

4. The powertrain apparatus of claim 3, wherein the friction member is a dog clutch selectively engaged between a transmission case and the first rotary member.

5. The powertrain apparatus of claim 1, wherein the engaging unit is a dog clutch.

6. The powertrain apparatus of claim 3, wherein the friction member is a brake fixed to a transmission case to brake the first rotary member.

* * * * *